United States Patent [19]

Curatolo et al.

[11] Patent Number: 4,481,354

[45] Date of Patent: Nov. 6, 1984

[54] PROCESS AND COMPOSITION FOR LOWERING THE REVERSIBLE PHASE CHANGE TEMPERATURE OF NYLON COMPOSITIONS

[75] Inventors: Benedict S. Curatolo, Maple Heights; Gerald P. Coffey, Lyndhurst, both of Ohio

[73] Assignee: The Standard Oil Company, Cleveland, Ohio

[21] Appl. No.: 451,194

[22] Filed: Dec. 20, 1982

[51] Int. Cl.$^3$ ............................................. C08G 69/46
[52] U.S. Cl. ................................... 528/487; 524/167; 524/170; 524/401; 524/606; 528/363; 528/488
[58] Field of Search ...................... 528/487, 488, 363; 524/167, 170, 401, 606

[56] References Cited

U.S. PATENT DOCUMENTS 3,343,980  9/1967  Hirshfield ........................... 528/487
3,878,173  4/1975  Biensan et al. ...................... 528/487

Primary Examiner—Harold D. Anderson
Attorney, Agent, or Firm—David P. Yusko; John E. Miller, Jr.; Larry W. Evans

[57] ABSTRACT

A process for modifying certain polyamides by use of a novel combination of an organic sulfone and a lithium halide as a processing aid to yield a modified polymer having thermal stability and a lowered melting point (lower than unmodified polymer).

17 Claims, No Drawings

PROCESS AND COMPOSITION FOR LOWERING THE REVERSIBLE PHASE CHANGE TEMPERATURE OF NYLON COMPOSITIONS

BACKGROUND OF THE INVENTION

The present invention relates to improvments in the processability of polyamides such as nylon polymers and more particularly to lowering the temperature at which nylon compositions undergo a reversible solid to liquid phase change.

Nylon is the generic name for a family of polyamide polymers characterized by the presence of the amide group—CONH. The utility of nylon compositions and products are well known with everyday examples including usage in brushes, tires, etc., as synthetic fibers, plastics, films and molding resins.

It is known that certain compositions may be added to nylon to aid in plasticization and in general as processing aids. Various polar, hydrogen-bonding plasticizers have been added to nylon compositions as flow aids to retard degradation of the resin and speed up processing. Commonly used in this regard is N-ethyl-(o,p)-toluenesulfonamide. Other compounds including other sulfonamides have also been found useful. See, "Plasticizers," Kirk-Othmer Encyclopedia of Chemical Technology, Vol. 18, 3rd Ed., 157-160 (J. Wiley & Sons, Inc., 1982). Nylon is also known to be plasticized by traces of water, anhydrous ammonia, and other polar solvents.

Generally, plasticizers are incorporated into a material to increase its workability, flexibility, or distensibility. The addition of a plasticizer may lower the melt viscosity, second-order transition temperature or the elastic modulus of the plastic. For a platicizer to be effective with any polymeric material, the plasticizer and polymeric material must be intimately mixed. This is typically accomplished by heating until one dissolves in the other or by dissolving in a solvent. Plasticizers may sometimes be utilized as processing aids to lower the processing temperature without altering the usefulness of the final product. See generally, "Plasticizers," supra, at 111-177. Plasticizers are also added to crystalline nylon resins in small amounts to improve such properties as flexibility, toughness, adhesion, dye penetration, etc.

Lithium halides such as lithium chloride have also been used in processes to lower the melting point of polyamides formed from dry lactams having 4 to 12 carbons atoms. See, e.g., U.S. Pat. No. 4,092,301 and the book *Fiber-forming Polymers (Recent Advances)*, pp. 157-159 (Noyes Data Corp., 1980). A disadvantage of these known processes is their failure to lower the melting point temperature of certain polyamides (notably nylon-3 compositions) and still maintain sufficient thermal stability to prevent decomposition.

SUMMARY OF THE INVENTION

According to the present invention a process for melting and recrystallizing nylon compositions at lower temperatures is improved by using as a processing aid, a lithium halide in combination with a sufficient amount of an organic sulfone to provide an agent for modifying nylon compositions by altering the solid to liquid phase change temperature so that a reversible phase change occurs at lower temperatures. The novel lithium halide/organic sulfone processing aid may be added directly to nylon compositions or may be incorporated with a nylon precursor such as an amide. Also amide polymerization may be advantageously conducted in the presence of the novel processing aid to gain the benefits of the invention.

DETAILED DESCRIPTION OF THE INVENTION

The process of the present invention and the novel processing aids of the invention are useful in modifying the behaviour of polyamides such as nylon compositions. Nylon resins are well known polymers having a multitude of uses. See, e.g., 1981-82 *Modern Plastics Encyclopedia*, Vol. 58, No. 10A, pp. 32-40 (McGraw-Hill, Inc., 1981). The present invention may be advantageously incorporated in modifying processes involving such nylon compositions as nylon-6 and nylon-66.

Generally, nylons are polymeric amides with aliphatic or aromatic chain segments connected by amide linkages. Most are semi-crystalline and have similar properties relative to toughness and chemical resistance while varying widely as to melting point, stiffness, and sensitivity to moisture.

Many nylons are made by condensing a diamine with a dibasic acid. For example, hexamethylene diamine (HMD) may be heated with adipic acid to yield nylon 6/6, a commercially available nylon of great importance. Similarly, other nylons may be made by using different acids or diamines.

Also, nylons may be made from monomers having both the acid and amine functions. For example, nylon 6 or polycaprolactam, a major engineering nylon, is made from epsilon-caprolactam.

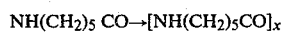

A particularly beneficial aspect of the present invention is its applicability to processing nylon-3 type compositions. Nylon-3 compositions may be made by known processes such as those disclosed in U.S. Pat. No. 4,283,524 whose teachings are hereby incorporated by reference.

There are several other known methods for producing nylon-3 type polymers using a variety of starting materials. For example, as described in U.S. Pat. No. 2,749,331, polyamides can be prepared from acrylamide by hydrogen transfer polymerization in the presence of a basic catalyst. Other processes for preparing polyamides employ beta-lactam and a ring opening polymerization (U.S. Pat. No. 3,220,983), condensation hydrolysis of beta aminopropionitrile (U.S. Pat. No. 3,499,874), condensation hydrolysis of oxydipropionitrile (Japan No. 68 27,617), thermal condensation of beta-alanine (U.S. Pat. No. 2,691,643) and the thermal polymerization of ethylene cyanohydrin (U.S. Pat. No. 3,125,353).

Most polyamides are produced by a condensation polymerization process. In other words, the polymerization occurs primarily by the reaction between pairs of functional groups, with water split out. For example, the thermal condensation of beta-alanine proceeds as follows:

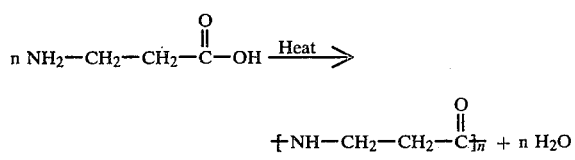

One of the disadvantages of nylon-3 compositions is that they decompose upon melting. Decomposition prevents these compositions from being thermally extruded. Thus, decomposition upon melting is an extremely undesirable property from the standpoint of commercial utilization of nylon compositions. In particular, melt spinning production of fibers is prevented and less economical means must be utilized to produce a fiber.

The process of the present invention utilizing the specified processing aids ameliorates the foregoing severe disadvantages by modifying nylon-3 compositions so that they behave like thermoplastics. Thus, when the inventive processing aids are used, thermal extrusion and melt spinning are made possible due to a lowering of the melting point of the nylon resin thereby allowing a reversible phase change to occur at a lower temperature than with unmodified nylon-3 compositions.

A further advantage of the present invention is that the modified nylon compositions once having been processed at lower temperatures may be separated from the processing aid easily to restore the original behaviour of the compositions. The processing aid which acts as a plasticizer may be removed by washing the nylon resin in a polar solvent such as methanol or even by washing in water.

A still further advantage of the present invention is that the processing aids may be packaged separately or as a kit for later addition to resin thus providing convenience and ease of storage. Also, the combination can be added to a nylon resin precursor such as an amide monomer e.g. acrylamide. The precursor/processing aid combination can be polymerized to form a nylon composition having the disclosed beneficial properties of the present invention. Following polymerization and processing, the processing aid (lithium halide and organic sulfone) may be easily removed as described above. Thus, polymerization of amides to form nylon compositions may be beneficially conducted in the presence of the inventive processing aids to provide resins which can be reversibly melted and recrystallized without decomposition at lower temperatures.

Although it may be desirable to remove the processing aid from the processed resin for certain applications, it does not appear to be necessary and the resin/processing aid combination appears to be quite stable.

The processing aid (plasticizer package) utilized by the invention is a modifying agent which comprises at least two components described below.

The invention employs as a modifying agent component (component I) a lithium halide, or mixtures thereof. Lithium chloride is preferred.

The invention also employs as a modifying agent component (component II) an organic sulfone. Necessary to this component is the presence of the sulfonyl radical —SO$_2$—. Suitable organic sulfones may be represented by the following formula:

$R_1$-SO$_2$-$R_2$ wherein the groups $R_1$ and $R_2$ are each independently alkyl, aryl, cycloalkyl, alkenyl, or mixtures thereof. Furthermore, the $R_1$ and $R_2$ groups may have inorganic moieties substituted thereon such as halide moieties e.g.—Cl. Advantageously $R_1$ and $R_2$ groups may be employed which are lower alkyl groups having 1 to 5 carbon atoms. It is preferred that the $R_1$ and $R_2$ groups be independently phenyl, ethyl, methyl or mixtures thereof. Examples of preferred sulfones include: diphenylsulfone; methylethylsulfone; and dimethylsulfone. Dimethylsulfone (DMSO$_2$) is especially preferred.

A beneficial and especially preferred combination of components I and II is lithium chloride and dimethylsulfone.

An amount of component I and component II that is effective in lowering the phase change temperature of nylon compositions while maintaining thermal stability sufficient to avoid decomposition is required. This is believed to necessitate inclusion of a sufficient amount of component I to enable a plasticizing effect or phase change transition temperature lowering effect while also including a sufficient amount of component II to obtain and maintain thermal stability of the applied to resin. However, regardless of how the components act and regardless of which component is responsible for what effect, it is the combination which is shown to have beneficial effects. Furthermore, it is within the skill of the art to optimize the proper amounts of component I and component II to be added to a particular amount of resin or nylon resin precursor. This optimization may be done without undue experimentation. Amounts or ratios used will vary depending upon practical considerations such as the particular process parameters chosen including, but not limited to, the particular resin or precursor and modifying components used as well as the particular processes in which these materials are to be modified.

Generally about 5 to 50% by weight of combined components I and II to the total combined weight of the resin and components I and II is suitable. Advantageously, a range of 15–40 weight percent may be employed. It is preferred to add the lowest amount of combined components I and II which will produce the desired effect, i.e. a lower melting point or plasticization with thermal stability. Typically, the ratio of weight percentages of component I to component II will be from about 0.1:1 to about 10:1 with a preferred ratio of about 1:1.

The processing aid of the present invention should be thoroughly mixed with the resin or resin precursor for best results.

Following are examples and counterexamples given to illustrate the process of the invention.

In all the following examples, unless otherwise indicated, grinding is done by mortar and pestle, and the mixtures are examined by placement between two glass discs which are then used in conjunction with a Fischer-Johns melting point apparatus. Reversibility of the phase change may be determined by commonly known techniques using a differential scanning calorimeter (DSC).

EXAMPLE 1

A mixture of about 0.5 gm. nylon-3 and 0.1 gm. lithium chloride and 0.1 gm. dimethylsulfone is prepared. The mixture is heated and at about 100° C. the mixture begins to soften. Fusion is complete by about 260° C. (most of the melting occurs between about 230° C. and 260° C.). Color is good (light yellow) and the melt is transparent when cool.

In comparison, when (1) an organic sulfone such as dimethylsulfone or (2) a lithium halide such as lithium chloride, are used separately, the following results are seen.

EXAMPLE 2

(Comparative-Organic Sulfone alone)

A mixture of about 0.5 gm. nylon-3 and 0.1 gm. dimethylsulfone is ground together. The mixture is heated up to about 320° C. There is no indication of melting up to about 320° C. and the mixture turns brown at a temperature of about 300° C.

EXAMPLE 3

(Comparative-Lithium Halide alone)

A mixture of about 0.5 gm. nylon-3 and 0.1 gm. lithium chloride is ground together. Melting is observed starting around 260° C. By 290° C. the mixture is essentially molten. Color is poorer than Example 1 (medium yellow) and the melt is transparent when cool.

EXAMPLE 4

(Comparative-Lithium Halide alone)

A mixture of about 0.5 gm. nylon-3 and 0.025 gm. lithium chloride is ground together. The mixture is heated and melting is observed but at higher temperatures (about 310–320° C. and color is not as good as in Example 2).

Also, in further comparison, it is seen that the non-reversible plasticizing effect of lithium halide alone is not seen with other alkali metal halides.

EXAMPLE 5

(Comparative—Sodium Halide alone)

A mixture of 0.5 gm. nylon-3 and 0.1 gm. sodium chloride is prepared. No melting is observed up to 320° C.

The following example of the invention demonstrates its usefulness in the context of a nylon precursor such as acrylamide.

EXAMPLE 6

The following is added to a glass liner:
71.08 gms. acrylamide
7.11 gms. dimethylsulfone
7.11 gms. lithium chloride
0.711 gm. p-methoxyphenol (MEHQ)
63.75 gms. of NH$_4$OH The glass liner is placed in a mini-Parr reactor which is nitrogen purged, sealed, and heated to approximately 190° C. for about four hours with stirring. The reaction pressure is vented during the final 15 minutes of the reaction. The reaction yields a light yellow, opaque solid product exhibiting reversible crystallization and melting at about 240° C. The nylon-3 containing product is about 37.4% insoluble in methanol and the insoluble portion exhibits about 33.1% crystallinity. The melting behaviour is determined using differential scanning calorimetry (DSC).

In comparison, Example 6 was repeated using varying amounts of lithium chloride alone.

EXAMPLE 7

(Comparative—Lithium Halide alone)

Example 6 is repeated but using about 14.22 gms. of lithium chloride and no dimethylsulfone. The product melts at about 275°–280° C. with degradation. Melting is not reversible.

EXAMPLE 8

(Comparative—Lithium Halide alone)

Example 6 is repeated but using about 7.11 gms. of lithium chloride. The product melts at about 230—275° C. with degradation.

The above examples and counter-examples demonstrate that dimethylsulfone by itself shows no useful plasticizing or temperature lowering effect on nylon-3. With the use of lithium chloride alone, the melting point of nylon-3 may be lowered; however the resin is not thermally stable. Unmodified nylon-3 compositions melt at about 330°–340° C. with decomposition. Surprisingly, when utilized together, lithium chloride and dimethylsulfone lower the melting point of nylon-3 and the resultant thermally stable polymer shows reversible recrystallization and melting. Thus a plasticizer package may be added to preformed nylon-3 or a suitable monomer or nylon precursor for polymerization in its presence to yield a thermally stable polymer having a lower melting point.

The above examples serve only to illustrate the invention and its advantages, and they should not be interpreted as limiting since further modifications of the disclosed invention will be apparent to those skilled in the art. All such modifications are deemed to be within the scope of the invention as defined by the following claims.

What is claimed is:

1. A process for modifying nylon composition to provide compositions having reversible recrystallization at a lower melting point comprising: contacting a nylon composition or mixtures thereof with a lithium halide and an organic sulfone.

2. A process as defined in claim 1 wherein said organic sulfone is of the formula $R_1$—$SO_2$—$R_2$ wherein $R_1$ and $R_2$ are each independently alkyl, aryl, cycloalkyl or combinations thereof.

3. A process as defined in claim 2 wherein $R_1$ and $R_2$ are each independently phenyl, an alkyl group having 1 to 5 carbon atoms, or combinations thereof.

4. A process as defined in claim 1 wherein said lithium halide is lithium chloride.

5. A process as defined in claim 1 wherein said nylon composition is nylon 3, nylon 6, or nylon 6/6.

6. A process as defined in claim 1 wherein said nylon composition is nylon 3, said lithium halide is lithium chloride and said organic sulfone is dimethyl sulfone.

7. A process as defined in claim 1 wherein said organic sulfone is dimethyl sulfone.

8. A process as defined in claim 1 wherein said nylon composition comprises nylon-3, nylon-6 or nylon-6/6.

9. A process as defined in claim 1 wherein said nylon composition comprises nylon-3.

10. A process as defined in claim 1 wherein said organic sulfone is of the formula $R_1$—$SO_2$—$R_2$ wherein $R_1$ and $R_2$ are each independently phenyl, an alkyl group having 1 to 5 carbon atoms or mixtures thereof.

11. A process as defined in claim 1 wherein said organic sulfone is dimethyl sulfone.

12. A process as defined in claim 10 wherein said $R_1$ and $R_2$ are each independently phenyl, methyl, or ethyl or combinations thereof.

13. A process as defined in claim 1 wherein said lithium halide comprises lithium chloride.

14. The process of claim 1 wherein the nylon composition which has been (a) contacted with a lithium halide and an organic sulfone is
(b) melted, and
(c) recrystallized.

15. A process as defined in claim 14 further comprising a treatment wherein the composition which is melted in (b) is modified prior to being recrystallized.

16. A process as defined in claim 15 wherein said treatment comprises shaping said composition melted in (b).

17. A process as defined in claim 14 further comprising (d) removing from said recrystallized composition substantially all lithium halide and organic sulfone.

* * * * *